(12) United States Patent
Rane

(10) Patent No.: US 9,691,175 B2
(45) Date of Patent: Jun. 27, 2017

(54) 3-D MODELS AS A NAVIGABLE CONTAINER FOR 2-D RASTER IMAGES

(71) Applicant: Bentley Systems, Incorporated, Exton, PA (US)

(72) Inventor: Ujjwal Suryakant Rane, Mumbai (IN)

(73) Assignee: Bentley Systems, Incorporated, Exton, PA (US)

( * ) Notice: Subject to any disclaimer, the term of this patent is extended or adjusted under 35 U.S.C. 154(b) by 190 days.

(21) Appl. No.: 13/920,641

(22) Filed: Jun. 18, 2013

(65) Prior Publication Data
US 2014/0320484 A1   Oct. 30, 2014

(51) Int. Cl.
G06T 15/00 (2011.01)
G06T 15/20 (2011.01)
G06T 19/00 (2011.01)
G06T 19/20 (2011.01)

(52) U.S. Cl.
CPC ............ G06T 15/20 (2013.01); G06T 19/006 (2013.01); G06T 19/20 (2013.01); G06T 2219/2004 (2013.01)

(58) Field of Classification Search
USPC ......................................................... 345/418
See application file for complete search history.

(56) References Cited

U.S. PATENT DOCUMENTS

| | | | |
|---|---|---|---|
| 8,026,929 B2 | 9/2011 | Naimark | |
| 8,160,400 B2 | 4/2012 | Snavely et al. | |
| 8,204,504 B2 | 6/2012 | Naden et al. | |
| 8,274,506 B1* | 9/2012 | Rees | 345/419 |
| 8,295,589 B2 | 10/2012 | Ofek et al. | |
| 2001/0043236 A1* | 11/2001 | Yamamoto | 345/781 |
| 2008/0024484 A1* | 1/2008 | Naimark | G06T 7/0028 345/419 |
| 2009/0015585 A1* | 1/2009 | Klusza | G06F 17/3028 345/420 |
| 2009/0179895 A1 | 7/2009 | Zhu et al. | |
| 2009/0245691 A1* | 10/2009 | Naimark | G06T 7/0044 382/285 |
| 2011/0234581 A1* | 9/2011 | Eikelis | G06K 9/00228 345/419 |

(Continued)

OTHER PUBLICATIONS

Anguelov, Dragomir, et al., "Google Street View: Capturing the World at Street Level," IEEE Computer Society, 2010, pp. 1-7.

(Continued)

*Primary Examiner* — Jacinta M Crawford
*Assistant Examiner* — Terrell Robinson
(74) *Attorney, Agent, or Firm* — Cesari and McKenna, LLP; James A. Blanchette

(57) ABSTRACT

In one embodiment, a 3-D model is employed as a navigable container for 2-D raster images, allowing 2-D raster images to be maintained and displayed within the context of the 3-D model. An image cloud level is provided for the 3-D model. Icons are provided within the image cloud level. Each icon corresponds to a respective 2-D raster image and is located at a position within the 3-D space of the 3-D model that corresponds to a position in the physical space of the physical world where the 2-D raster image was originally captured Upon selection of a particular icon, a combined view is shown, depicting the corresponding 2-D raster image combined with a corresponding portion of the 3-D model.

16 Claims, 14 Drawing Sheets

(56) References Cited

U.S. PATENT DOCUMENTS

2011/0285696 A1* 11/2011 Ocali et al. .................. 345/419
2011/0310088 A1   12/2011 Adabala et al.
2012/0133640 A1*  5/2012 Chin et al. ................... 345/419
2013/0135446 A1   5/2013 Lee et al.

OTHER PUBLICATIONS

Pomaska, Guenter, "Utilization of Photosynth Point Clouds for 3D Object Reconstruction," 22$^{nd}$ CIPA Symposium, Kyoto, Japan, Oct. 11-15, 2009, pp. 1-5.

* cited by examiner

| A1 (93, 415, 79) | A2 (303, 406, 0) | A3 (371, 55, 100) |
| --- | --- | --- |
| B1 (88, 25, 0) | B2 (163, 46, 95) | B3 (392, 175, 83) |
| C1 (303, 406, 65) | C2 (278, 346, 0) | C3 (31, 25, 99) |

3-D MODELS AS A NAVIGABLE CONTAINER FOR 2-D RASTER IMAGES

RELATED APPLICATION

This application claims priority to Indian Patent Application No. 1927/CHE/2013 filed on Apr. 30, 2013 by Ujjwal Suryakant Rane, entitled "3-D Models as a Navigable Container for 2-D Raster Images", the contents of which are incorporated by reference herein.

BACKGROUND

Technical Field

The present disclosure relates generally to computer-aided design, and more specifically to inter-relating a three-dimensional (3-D) model and two-dimensional (2-D) raster images, such as photographs.

Background Information

To better manage the complexities of modern structures, engineers, architects, and other professionals often turn to computer-aided design. Using a modeling application, they may create a 3-D model of the structure. In the 3-D model, the structure may be represented by a collection of individual elements, for example, vector elements (e.g., lines, polygons, etc.), that represent important features, such as boundaries, openings, partitions and the like. Depending on the particular 3-D model, the level of detail provided by the individual elements varies. The greater the level of detail, typically the greater the time and cost required to construct the 3-D model. Producing extremely detailed models may be time or cost prohibitive in some situations. Further, even when a 3-D model is very detailed, it may not accurately reflect real-world conditions. For example, when a 3-D model is used to build a structure, the "as-built" condition of the structure may be significantly different than the model. During construction, on-site changes are often made that are not propagated back to the 3-D model. Further, after initial construction, various repairs and renovations may be made that similarly are not propagated back to the 3-D model.

Engineers, architects, and other professionals also utilize 2-D raster images (e.g., photographs) when trying to better understand structures. In a 2-D raster image, information is generally displayed as a grid of discrete points (pixels) that each have a corresponding color value. A 2-D raster image may be characterized by a width and a height in pixels and by a color depth that indicates a number of colors each pixel may represent. 2-D raster images are generally simple to capture, for example, by taking a digital photograph, and can contain extensive amounts of information. However, the information contained in 2-D raster images is generally difficult to utilize. While features may be shown, it is typically difficult to determine the precise position of these features in relation to other features, and the overall geometry of the structure.

In some cases, both a 3-D model and 2-D raster images may be available for the same structure. However, rather than complement each other, with existing techniques they typically compounded other's deficiencies. Accordingly, there is a need for improved techniques that permit effective use of 3-D models and 2-D raster images together.

SUMMARY

In one embodiment, a 3-D model is employed as a navigable container for 2-D raster images, allowing 2-D raster images (e.g., photographs) to be maintained and displayed within the context of the 3-D model. An image cloud level (e.g., a photo cloud level) is provided in the 3-D model. Icons are provided within the image cloud level. Each icon corresponds to a respective 2-D raster image, and is located at a position (e.g., a camera eye point) within the 3-D space of the 3-D model that corresponds to a position in physical space of the physical world from where the 2-D raster image was originally captured (e.g., from were the photograph was "snapped"). Upon selection of a particular icon, a combined view is shown, depicting the corresponding 2-D raster image combined with (e.g., superimposed upon) a portion of the 3-D model as viewed from the position (e.g., camera eye point). The combined view allows information from the 2-D raster image to be interrelated to, and understood together with, information conveyed by the 3-D model.

The combined view, in some embodiments, may be generated and stored as a saved view, such that when a particular icon is selected, the corresponding saved view is retrieved and displayed. The saved view may be prepared using a view creation procedure. In an example view creation procedure, the 2-D raster image is imported into a modeling environment. Camera parameters are determined for the 2-D raster image. The camera parameters may represent camera position (e.g., camera eye point) within the 3-D space of the 3-D model, which corresponds to a position in physical space where the 2-D raster image was originally captured. In some cases, the camera parameters may be determined using geo-coordinate metadata associated with the 2-D raster image. In other cases, the camera parameters may be determined using an image matching technique. In still other cases, another technique may be employed.

The determined camera parameters are used to define a view of the 3-D model. This view matches a view of the structure in the physical world from where the 2-D raster image was captured. The 2-D raster image is processed to prepare it for combination with this view of the 3-D model. Such processing may include orienting and scaling the 2-D raster image, as well as modifying the raster image, for example by setting a transparency level, removing one or more parts of the 2-D raster image, or performing another modification to the 2-D raster image. When ready, the processed 2-D raster image is combined with the view of the 3-D model (e.g., superimposed upon the view of the 3-D model), and the resulting combined view saved. This procedure may be repeated for different 2-D raster images, to populate the image cloud level of the 3-D model.

It should be understood that a variety of other embodiments may be implemented, including those other embodiments discussed below, and variations and refinements thereof. This Summary is intended simply as an introduction to the reader, and does not indicate or imply that the techniques mentioned herein are necessary, or essential, to the invention.

BRIEF DESCRIPTION OF THE DRAWINGS

The description below refers to the accompanying drawings of example embodiments, of which.

DETAILED DESCRIPTION

Figure 1:
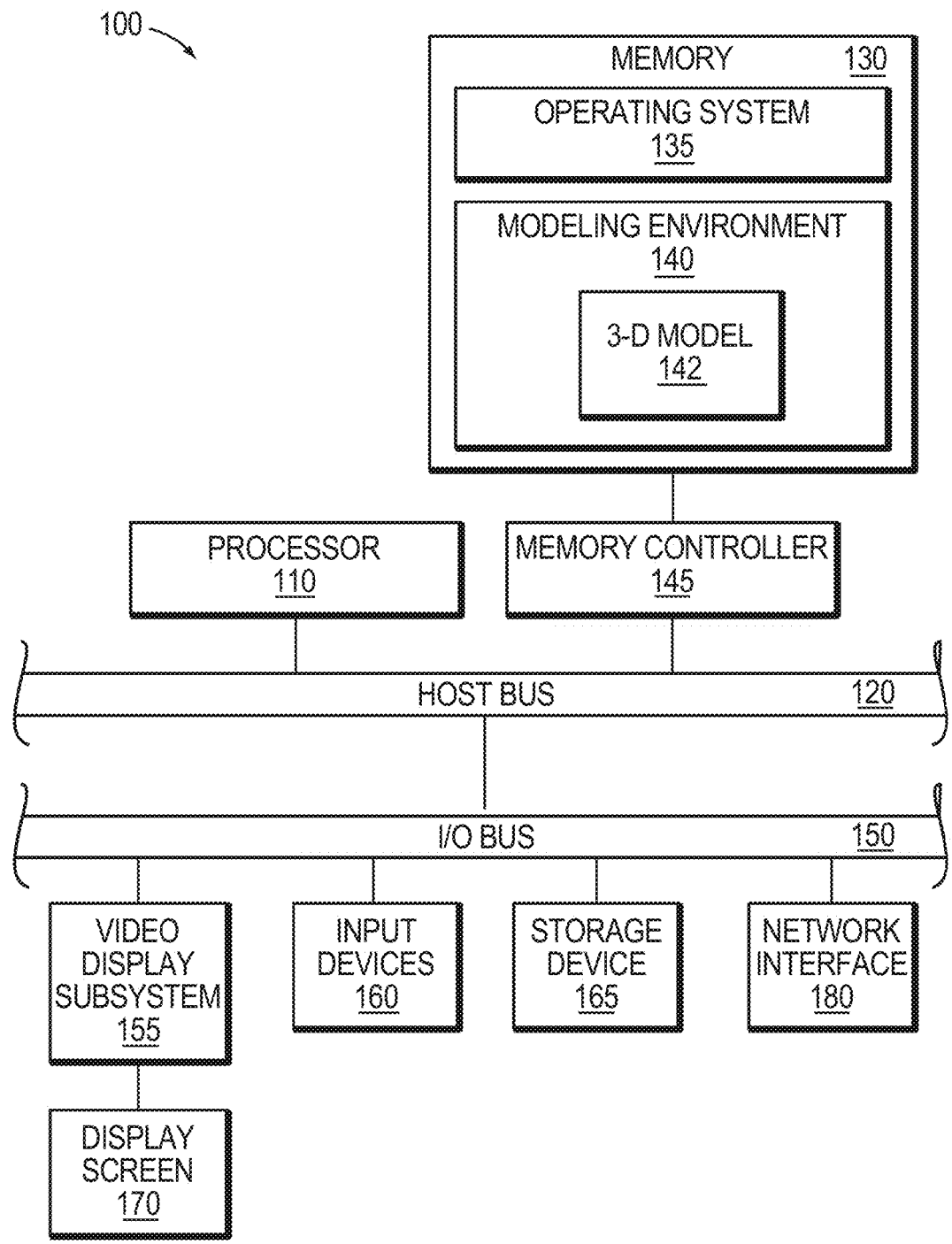
FIG. 1 is a block diagram of an example electronic device that may be used with the present techniques.

FIG. 1 is a block diagram of an example electronic device 100 that may be used with the present techniques. The electronic device 100 may be a designed for stationary operation (e.g., may be a desktop computer), or may be portable electronic device (e.g., a notebook computer, a tablet computer, a smartphone, etc.). The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 145.

The memory 130 is configured to store at least a portion of computer-executable instructions and data for an operating system (OS) 135 while the electronic device 100 is operating. In addition, the memory 130 may be configured to store at least a portion of computer-executable instructions and data for a modeling environment 140. The modeling environment 140 may be the MicroStation® environment available from Bentley Systems Inc., or another type of modeling environment provided by another vendor. The modeling environment 140 may operate as a stand-alone software application. In some cases, the modeling environment may also support a number of different discipline-specific applications, which are built upon its functionality. A 3-D model 142 of a structure may be created and/or maintained by the modeling environment 140. The 3-D model 142 may represent the structure as a collection of individual elements, for example, vector elements (e.g., lines, polygons, etc.). As used herein, the term "structure" refers to an entity constructed of a plurality of parts, interconnected in a defined arrangement. A structure may be a building, a civil construction, a plant, a vehicle, a machine, or some other type of real-world object. The 3-D model 142 may include a number of levels that convey different types of information. As discussed below, one such level may be an image cloud level (e.g., a photo cloud level) that includes a plurality of icons corresponding to 2-D raster images (e.g., photographs).

The host bus 120 of the electronic device 100 is coupled to an input/output (I/O) bus 150, for example via an intermediary bus controller. A video display subsystem 155 may include a display screen 170 and hardware to drive the display screen. The video display subsystem 155 is coupled to the I/O bus 150. The display screen 170, among other functions, may show a graphical user interface (GUI) of the modeling environment 140. One or more input devices 160, such as a keyboard, touch sensor, touchpad, mouse, etc., are provided to allow a user to interact with the electronic device 100. A persistent storage device 165, such as a hard disk drive, a solid-state drive, or another type of persistent data store, is coupled to the I/O bus 150, and may persistently store computer-executable instructions and data, that are available to be loaded into the volatile memory 130 when needed. For example, computer-executable instructions and data for the operating system 135, the modeling environment 140, and the 3-D model 142 may be stored in the persistent storage device 165. The I/O bus 150 may further be coupled to a network interface 180 that interfaces with a computer network, such as the Internet. The computer network may allow communication between the electronic device 100 and other devices, using any of a number of well known networking protocols. Such communication may enable a number of collaborative, distributed, and remote computing arrangements.

As discussed above, the 3-D model 142 of a structure, via an image cloud level (e.g., photo cloud level) may, operate as a navigable container for 2-D raster images (e.g. photographs) of the structure, allowing 2-D raster images to be maintained and displayed within the context of the 3-D model 142. When the image cloud level of the model is displayed in the GUI of the modeling environment 140, icons are provided that each corresponds to a respective 2-D raster image.

Figure 2:
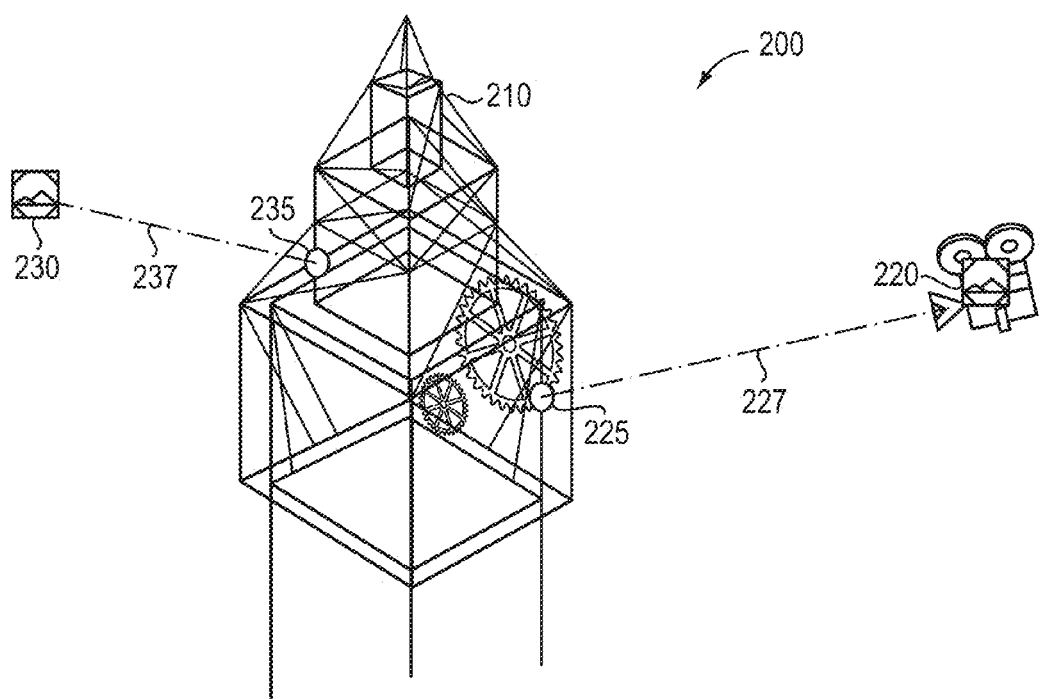
FIG. 2 is a view of an example 3-D model depicting an image cloud level having icons.

FIG. 2 a view of an example 3-D model 210 depicting an image cloud level having icons 220, 230. While the example 3-D model 210 depicts a clock tower, it should be understood that the model may depict any of a variety of types of structures, and the use of a clock tower is an arbitrary example. Each icon 220, 230 is located at a position (e.g., a camera eye point) within the 3-D space of the example 3-D model 210 that corresponds to a position in physical space of the physical world where the 2-D raster image was originally captured (e.g., were the photograph was "snapped"). In addition to a position, the icons 220, 230 may have an orientation. For instance, they each may be oriented towards corresponding target points 225, 235 on the example 3-D model 210. The icons may be shaped to indicate this orientation. For example, an icon 220 may be shaped to approximate a camera, the direction of a lens portion of the camera indicating orientation. Further, line segments 227, 237 extending from the icons 220, 230 to the target points 225, 235 may help indicate orientation. Each icon 220, 230 may function as a link, and, upon selection, a related combined image pointed to by the link may be shown. The combined image may depict a 2-D raster image corresponding to the icon combined with (e.g., superimposed on) a portion of the example 3-D model 210, as viewed from the position (e.g., the camera eye point).

Figure 3A:
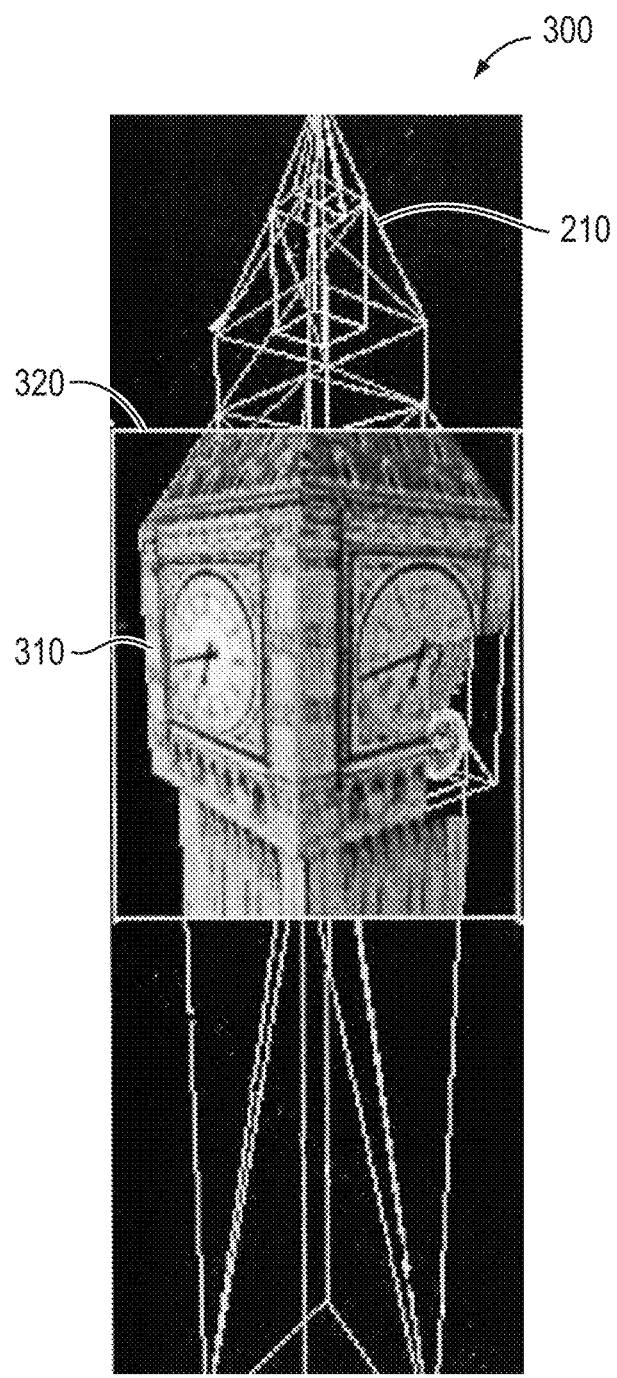
FIG. 3A is a combined view showing an example 2-D raster image combined with (e.g., superimposed on) a corresponding portion of the example 3-D model.

FIG. 3A is a combined view 300 showing a 2-D raster image 310 combined with (e.g., superimposed on) a corresponding portion 320 of the example 3-D model 210. Elements of the example 3-D model 210 outside the portion 320 are still visible, as well as elements that fall within any removed parts of the 2-D raster image 310. The combined view 300 allows information from the 2-D raster image 310 to be interrelated with, and understood in the context of, the example 3-D model 210.

The combined view 300 may be displayed in the GUI of the modeling environment 140 in a variety of different ways. For example, to show greater detail, the combined view 300 may be depicted as an enlargement upon the example 3-D model 210.

Figure 3B:
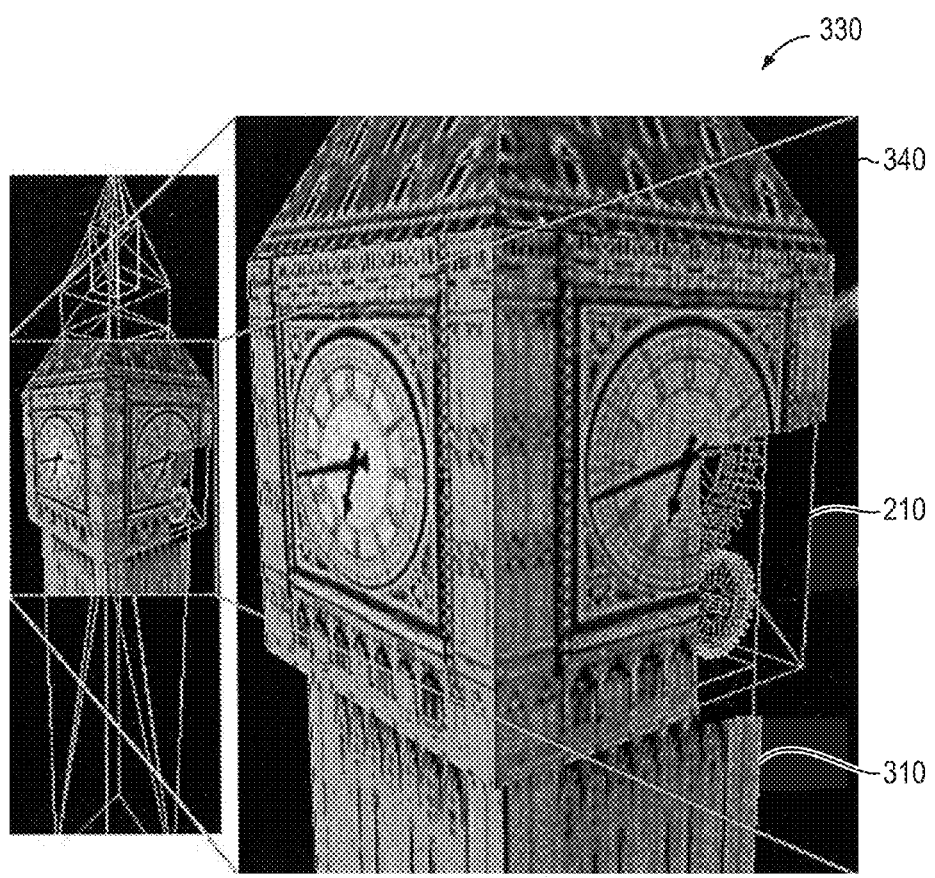
FIG. 3B is a combined view showing the example 2-D raster image combined with (e.g., superimposed on) the corresponding portion of the example 3-D model in an enlargement.

FIG. 3B is a combined view 330 showing the example 2-D raster image 310 combined with (e.g., superimposed on) a corresponding portion of the example 3-D model 210 in an enlargement 340. The enlargement 340 may coincide with the portion of the example 3-D model 210 visible from the position (e.g., the camera eye point).

Figure 4A:
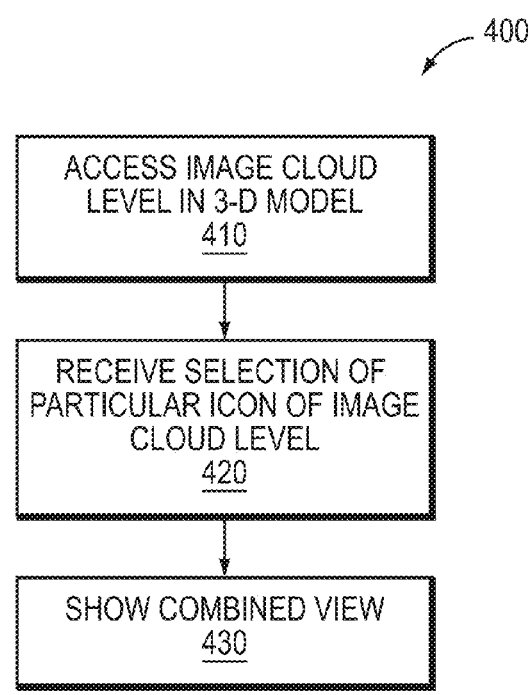
FIG. 4A is a flow diagram of an example sequence of steps for using a 3-D model as a navigable container for 2-D raster images.

FIG. 4A is a flow diagram of an example sequence of steps 400 for using a 3-D model as a navigable container for 2-D raster images. At step 410, an image cloud level (e.g., photo cloud level) is accessed in the 3-D model, and includes icons that each correspond to a respective 2-D raster image. At step 420, a selection is received for a particular icon of the image cloud level. In response to receipt of the selection, at step 430, a combined view is shown depicting the corresponding 2-D raster image combined with (e.g., superimposed upon) a corresponding portion of the 3-D model, as viewed from the position (e.g., camera eye point). The combined view, in some embodiments may be generated in advance, and stored in memory 130 as a saved view. The saved view may be prepared according to a combined view creation procedure.

Figure 4B:
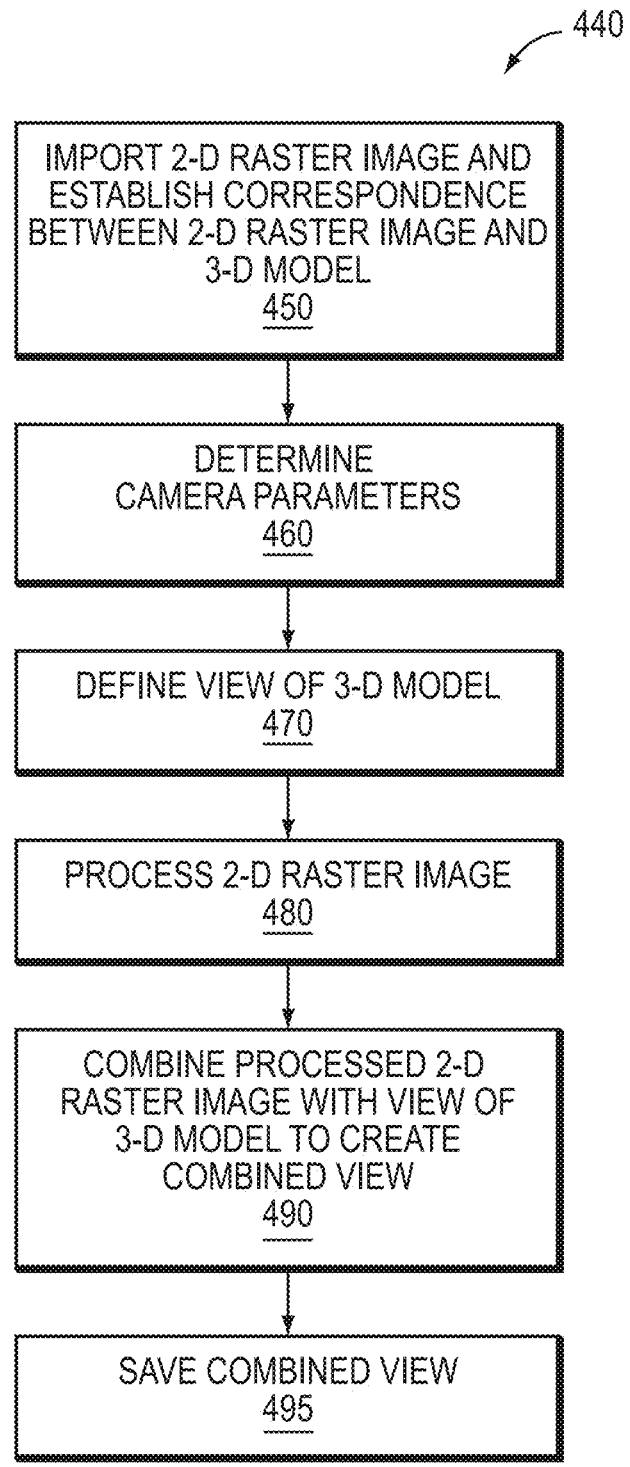
FIG. 4B is a flow diagram of an example sequence of steps for a combined view creation procedure that may be used to produce a saved view.
Figure 5:
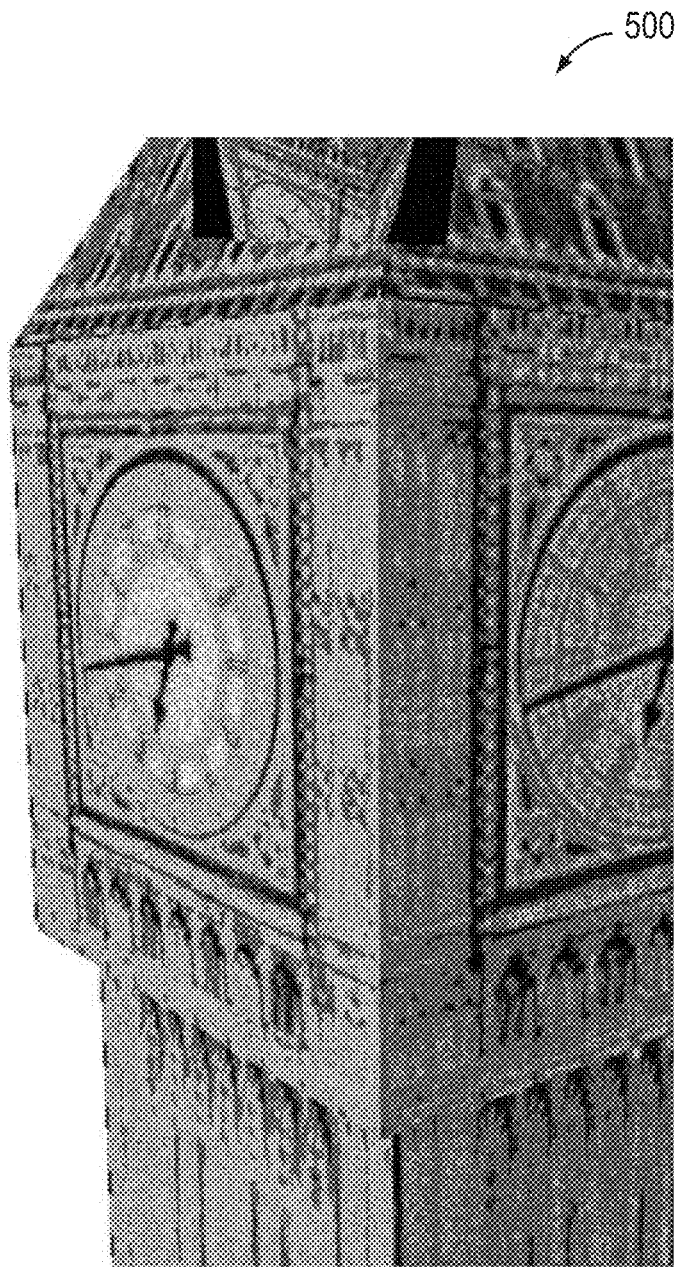
FIG. 5 is an example unprocessed 2-D raster image.

FIG. 4B is a flow diagram of an example sequence of steps 440 for a combined view creation procedure that may be used to produce a saved view. At step 450, an unprocessed 2-D raster image (e.g., photograph) is imported into the modeling environment 140 and correspondence is established between the 2-D raster image and 3-D model. FIG. 5 is an example unprocessed 2-D raster image 500.

At step 460, camera parameters are determined for the 2-D raster image. The camera parameters may represent camera position (e.g., camera eye point) within the 3-D space of the 3-D model, which corresponds to a position where the 2-D raster image was originally captured. In some cases, the camera parameters may be determined using geo-coordinate metadata associated with the 2-D raster image. For example, the 3-D model may be geo-located, and the geo-coordinate metadata may be used to calculate camera position (e.g., camera eye point) within the 3-D space of the 3-D model. Alternatively, for example, if the 3-D model is not geo-located or geo-coordinate metadata is not available for the 2-D raster image, another technique may be employed. In one embodiment, the camera parameters may be determined using an image matching technique. Further details of an example image matching technique are discussed below in reference to FIGS. 8-11B.

At step 470, the camera parameters are used to define a view of the 3-D model. The view of the 3-D model may be defined by positioning a virtual camera at a position in the 3-D space of the 3-D model indicated by the camera parameters. The portion of the 3-D model visible to the virtual camera represents the view. Such view coincides with a portion of the structure in the physical world visible from where the 2-D raster image was captured (e.g., where the photograph was captured).

Figure 6:
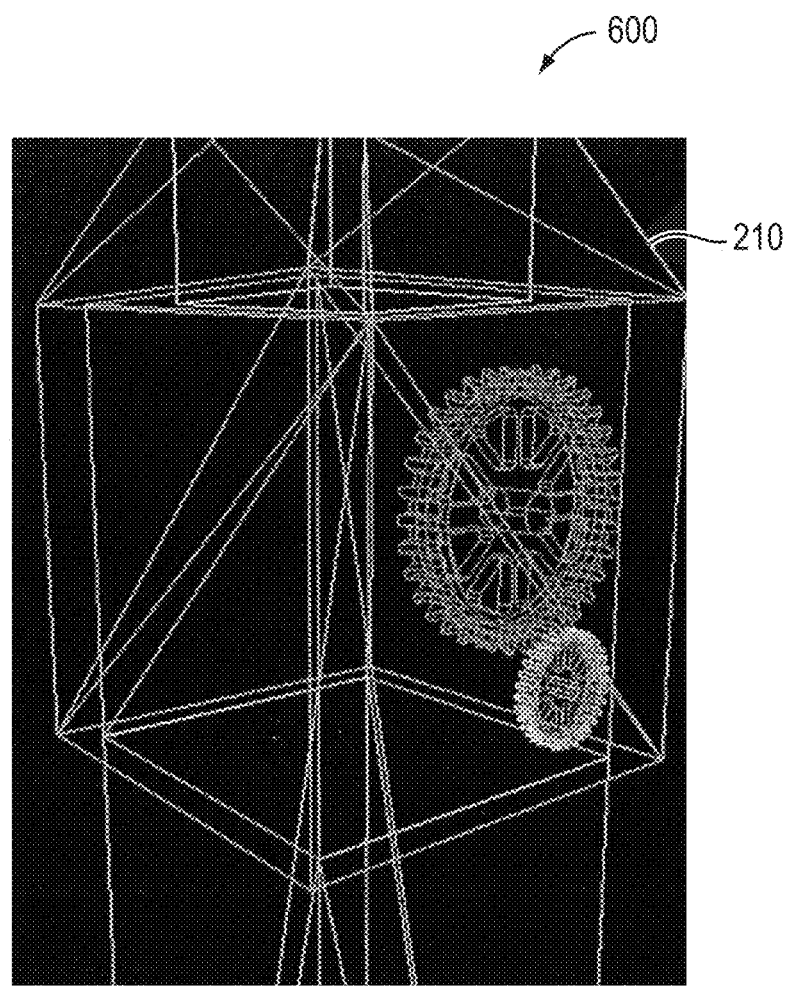
FIG. 6 is a view of the example 3-D model defined by camera parameters.

FIG. 6 is a view 600 of the example 3-D model 210 defined by camera parameters. In comparison to FIG. 2, which shows the entire example 3-D model 210, the view 600 defined by the camera parameters shows only a specific portion thereof.

Figure 7:
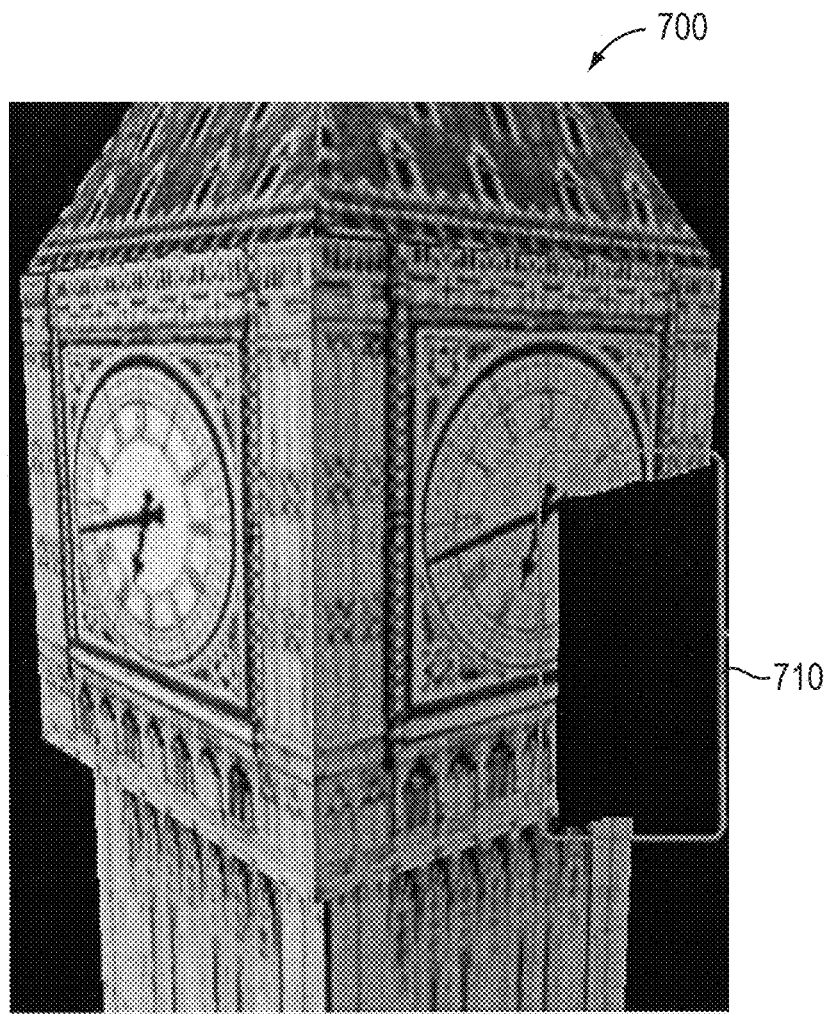
FIG. 7 is a processed version of the example 2-D raster image of FIG. 5 showing a part of the 2-D raster image removed.

At step 480, the 2-D raster image is processed to prepare it for combination with the view of the 3-D model. Such processing may include orienting the scaling the 2-D raster image. Further details regarding an example technique for orienting and scaling the raster image are discussed below in reference to FIG. 12. Such processing may also include modifying the 2-D raster image, for example by setting a transparency level, removing one or more parts of raster image, or performing another modification to the 2-D raster image. FIG. 7 is a processed version 700 of the example unprocessed 2-D raster image 500 of FIG. 5, showing a part 710 removed. Removal of the part creates a "window" in the 2-D raster image through which elements of the 3-D model may eventually be visible, when the 2-D raster image is combined with the 3-D model.

At step 490, the processed 2-D raster image is combined with the view of the 3-D model (e.g., superimposed upon the view of the 3-D model) to produce a combined view. FIGS. 3A and 3B, previously introduced above, depict example combined views that may be produced through this combination. At step 495 the combined view is saved. The saved view may be associated with a corresponding icon of the image cloud level (e.g., photo cloud level) of the 3-D model. The sequence of steps 440 may be repeated for each 2-D raster image, to populate the image cloud level.

Figure 8:
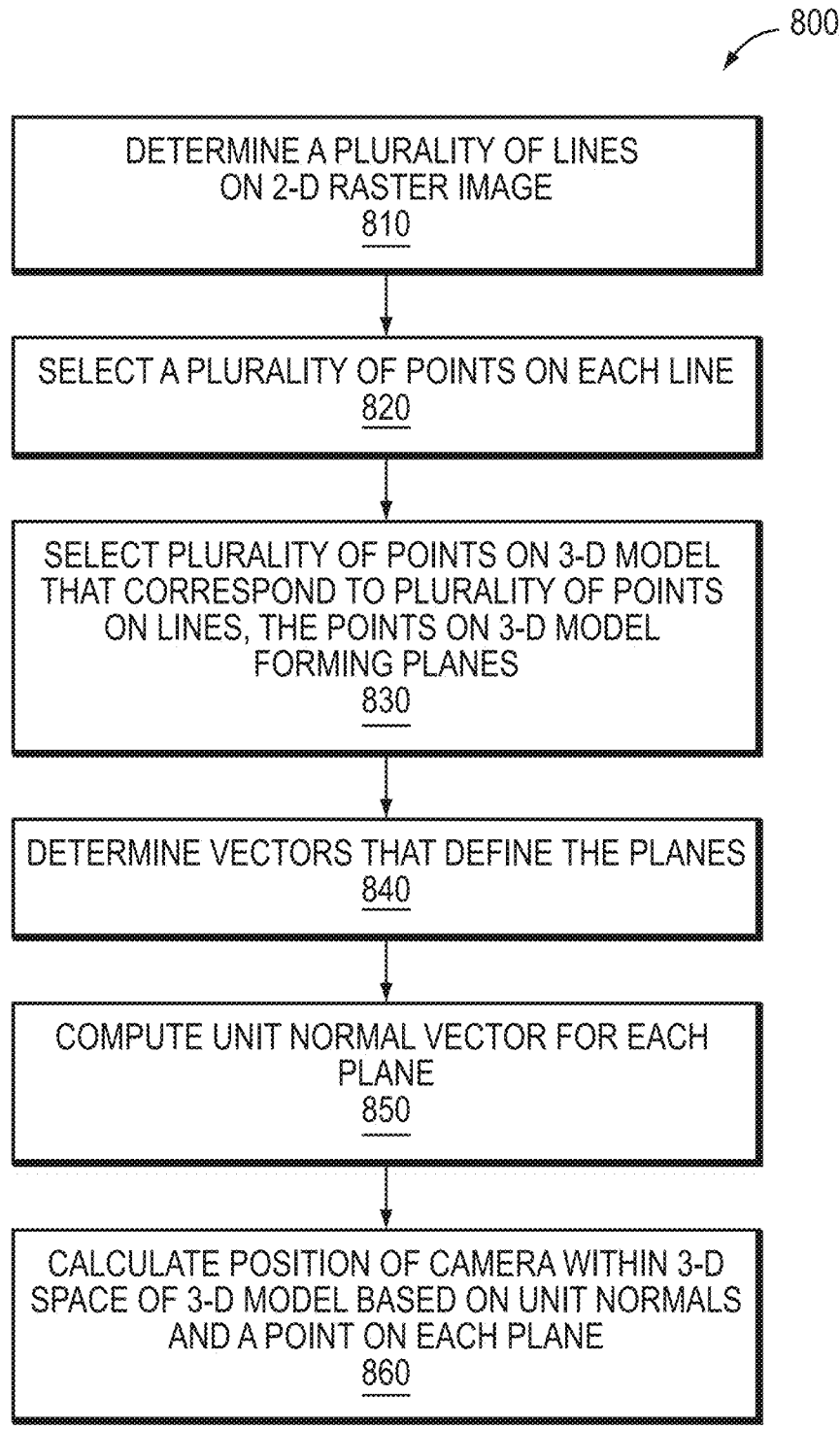
FIG. 8 is a flow diagram of an example sequence of steps for an image matching technique that may be used to determine camera parameters.

As discussed above, the camera parameters mentioned in the sequence of steps 440 of FIG. 4B may be determined by any of a number of techniques, including an image matching technique. FIG. 8 is a flow diagram of an example sequence of steps for an image matching technique that may be used to determine the camera parameters. The image matching technique may be implemented by an image matching routine of the modeling environment 140, or by another application. At step 810, the image matching routine determines (e.g., "draws") a plurality of (e.g., 3) lines on the 2-D raster image (e.g., photograph) that pass over features that are easily identifiable in a corresponding 3-D model. The feature may represent corners, openings, or other aspects of the structure which are likely to be clearly represented by elements in the corresponding 3-D model.

Figure 9:
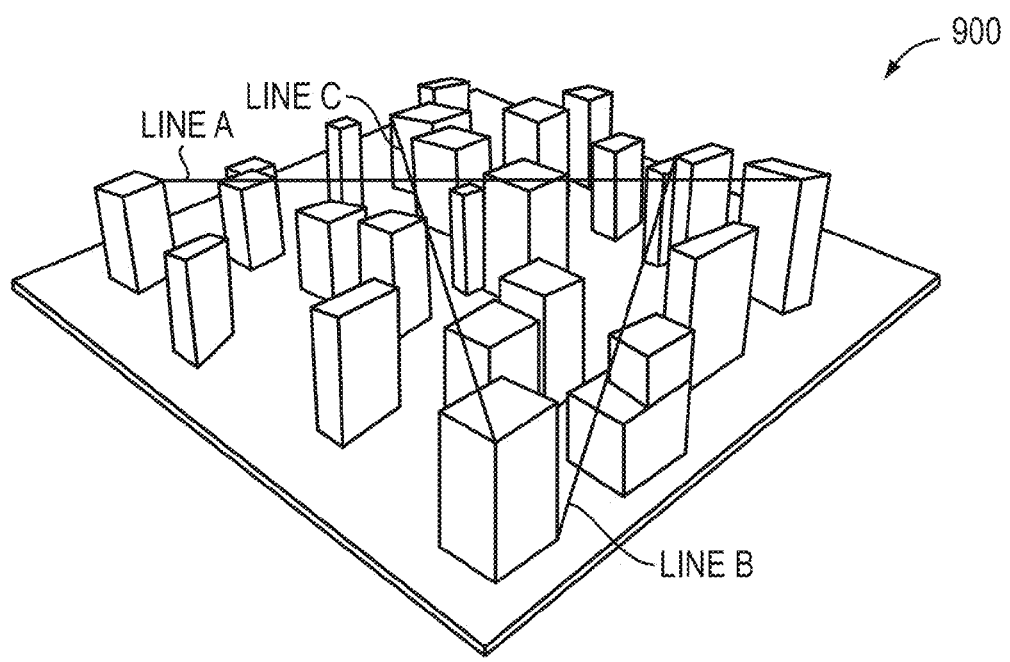
FIG. 9 is an example simplified 2-D raster image illustrating lines over features that are easily identifiable.

FIG. 9 is an example simplified 2-D raster image 900 illustrating determination of lines over features that are easily identifiable in a 3-D model. The simplified 2-D raster image 900 depicts a generic series of geometric shapes, to illustrate the principles of the technique. It should be understood, however, that a typical 2-D raster image will include significantly greater detail, to represent the actual appearance of a structure. Line A, Line B, and Line C are "drawn" upon the simplified 2-D raster image 900, to the extent possible, over corners of the geometric shapes, as these are likely to be clearly represented by elements of a corresponding 3-D model.

Figure 10:
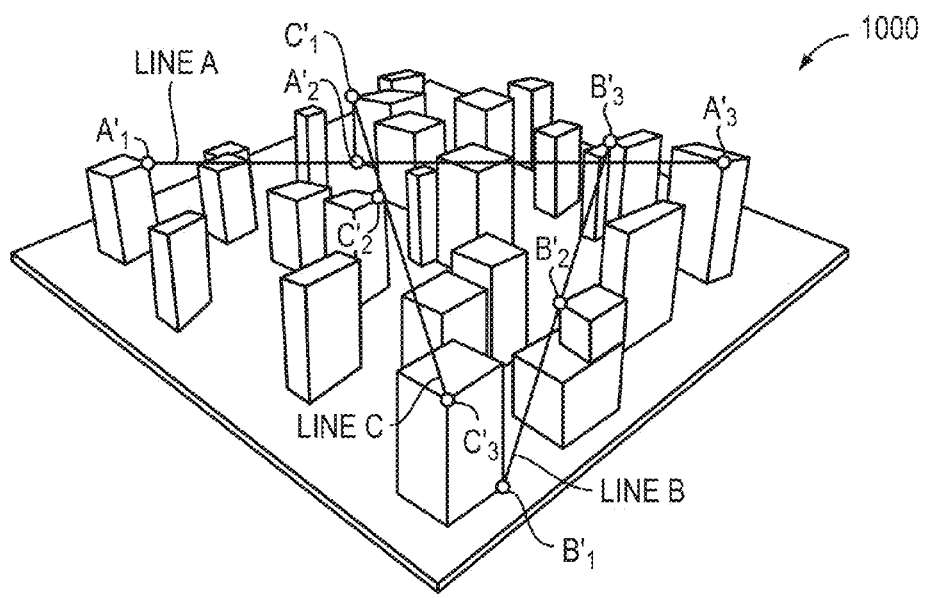
FIG. 10 is an example simplified 2-D raster image with points selected upon each line.

At step 820, the image matching routine selects a plurality (e.g., 3) points on each line that that are likely to be clearly represented by elements in the corresponding 3-D model. FIG. 10 is an example simplified 2-D raster image 1000 with points selected upon each line. For example, points $A_1'$, $A_2'$ and $A_3'$ are selected upon Line A, points $B_1'$, $B_2'$ and $B_3'$ are selected upon Line B, and points $C_1'$, $C_2'$ and $C_3'$ are selected upon Line C.

At step 830, the image matching routine locates a plurality of points (e.g., 9 points) on the corresponding 3-D model which correspond to the plurality (e.g., 9) points on the lines of the simplified 2-D raster image 900. This plurality of points on the 3-D model form a plurality of planes (e.g., 3 planes).

Figures 11A, 11B:
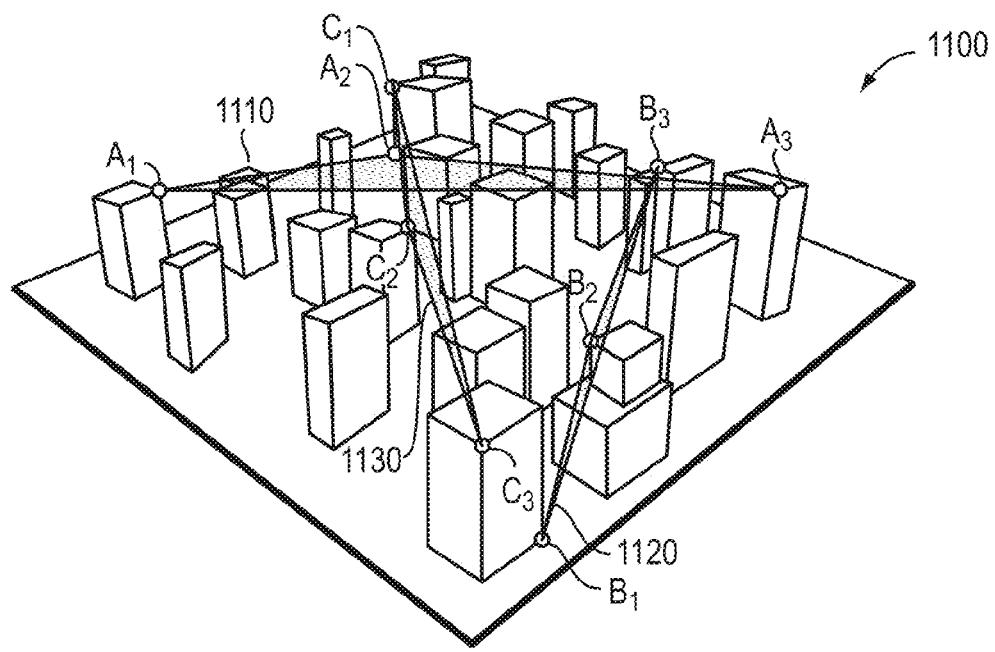
FIG. 11A is a depiction of a corresponding 3-D model, with points selected based on points on lines in the example simplified 2-D raster image.
FIG. 11B is a table providing example coordinates in the 3-D space of the 3-D model for the points selected in FIG. 11A.

FIG. 11A is a depiction 1100 of a corresponding 3-D model, with points selected based on points on lines in the 2-D raster image. The points form planes (e.g., 3 planes) within the 3-D space of the 3-D model. For example, a first plane 1110 is formed by points $A_1$, $A_2$ and $A_3$ on the 3-D model that correspond to points $A_1'$, $A_2'$ and $A_3'$ of the simplified 2-D raster image, a second plane 1120 is formed by points $B_1$, $B_2$ and $B_3$ on the 3-D model that correspond to points $B_1'$, $B_2'$ and $B_3'$ of the simplified 2-D raster image, and a third plane 1030 is formed by points $C_1$, $C_2$ and $C_3$ on the 3-D model 1100 that correspond to points $C_1'$, $C_2'$ and $C_3'$ of the simplified 2-D raster image. FIG. 11B is a table 1150 providing example coordinates in the 3-D space of the 3-D model for the points $A_1$-$C_3$ in FIG. 11A.

At step 840, vectors (e.g., 2 vectors) are determined that define the plurality of planes (e.g., 3 planes). The vectors may be sides of a triangle formed by the three points that define the respective plane. For example, referring to FIG. 11A, two vectors $\overline{A_1A_2}$ and $\overline{A_1A_3}$ may be determined for the first plane 1110. Using the example coordinates from table 1050, the two vectors may be calculated as:

$$\overline{A_1A_2} = A_2 - A_1$$
$$= (303, 406, 0) - (93, 415, 79)$$
$$= \langle 210, -9, -79 \rangle$$

and $$\overline{A_1A_3} = A_3 - A_1$$
$$= (371, 55, 100) - (93, 415, 79)$$
$$= \langle 278, -360, 21 \rangle$$

Two vectors may similarly be calculated for the second and third planes 1120, 1130.

At step 850, a unit normal vector is computed for each of the planes. The unit normal vector for a plane, together with a point on the plane, completely defines the plane. To computer a unit normal vector, first a normal vector may be computed as a cross product. For example, the normal vector, $\overline{N_A}$, for the first plane 1110, may be calculated using the example coordinates from table 1150, as:

$$\overline{N_A} = \overline{A_1A_2} \times \overline{A_1A_1}$$
$$= \langle 210, -9, -79 \rangle \times \langle 278, -360, 21 \rangle$$
$$= \langle -28620, -26372, -73098 \rangle$$

The unit normal vector may be determined from the normal vector. For example, the unit normal, $\widehat{n_A}$, for the first plane 1110 may be determined from normal vector, $\overline{N_A}$, using the example coordinates from table 1150, as:

$$\widehat{n_A} = \frac{\overline{N_A}}{|\overline{N_A}|}$$

$$= \frac{(-28620, -26372, -73098)}{\sqrt{(-28620)^2 + (-26372)^2 + (-73098)^2}}$$

$$= (-28620, -26372, -73098) \div 82812$$

$$= (-0.3456, -0.3185, -0.8827)$$

Two unit normal vectors may similarly be calculated for the second and third planes 1120, 1130. The unit normal vectors, and related points, on the planes 1110-1130, calculated using the example coordinates from table 1150, may be:

| PLANE | POINT | UNIT NORMAL |
|---|---|---|
| A | A1 (93, 415, 79) | $\widehat{N_A}$ = (−0.3456, −0.3185, −0.8827) |
| B | B1 (88, 25, 0) | $\widehat{N_B}$ = (−0.4750, 0.8604, 0.1848) |
| C | C1 (303, 406, 65) | $\widehat{N_C}$ = (−0.8053, 0.5575, −0.2017) |

At step 860, a camera position (e.g., camera eye point) within the 3-D space of the simplified 3-D model 900 is calculated based on the unit normal vectors and a point on each of the planes. As discussed above, the camera position (e.g., camera eye point) corresponds to a position in the physical space of the physical world from which the simplified 2-D raster image 900 was originally captured (e.g., were the photograph was "snapped"). A vector joining any point on a plane to another point on the plane will be perpendicular to the unit normal vector, and therefore their dot product will be zero. Using this property, simultaneous equations may be defined that, when solved, yield a point that is in all three planes, and therefore may be used as the camera position (e.g., camera eye point). For example, continuing the example of FIGS. 9-11B, the simultaneous equations may be defined as:

$$\overline{PA_1} \cdot \widehat{n_A} = 0$$
$$\overline{PB_1} \cdot \widehat{n_A} = 0$$
$$\overline{PC_1} \cdot \widehat{n_A} = 0$$

These simultaneous equations may be solved to yield a point (−166,−271,467) in the coordinate system of the simplified 3-D model 900 that is used as the camera position (e.g., camera eye point).

From the calculated camera position (e.g., camera eye point), and the 2-D raster image and 3-D model, additional camera parameters may be calculated, including a target point upon the 3-D model for a virtual camera, angle of the virtual camera, roll of the virtual camera, etc. These additional camera parameters, similar to camera position, correspond to parameters in physical space where the 2-D raster image was originally captured.

As discussed above, after the camera position (e.g., camera eye point) is determined, processing may be performed to, among other things, orientate and scale the 2-D raster image within the 3-D space of the 3-D model, so that it will match with elements of the 3-D model. The technique may be implemented by a processing routine of the modeling environment 140, or by another application. Orientating the 2-D raster image may involve determining angles for the 2-D raster image in the 3-D space of the 3-D model. Scaling of the 2-D raster image may involve a determining a position in the 3-D space of the 3-D model to place the orientated raster image. Due to perspective, if this position is chosen to be closer to the camera position, the 2-D raster image will appear larger, and if this position is chosen to be further away from the camera position, the 2-D raster image will appear smaller, thereby scaling the 2-D raster image.

Figure 12:
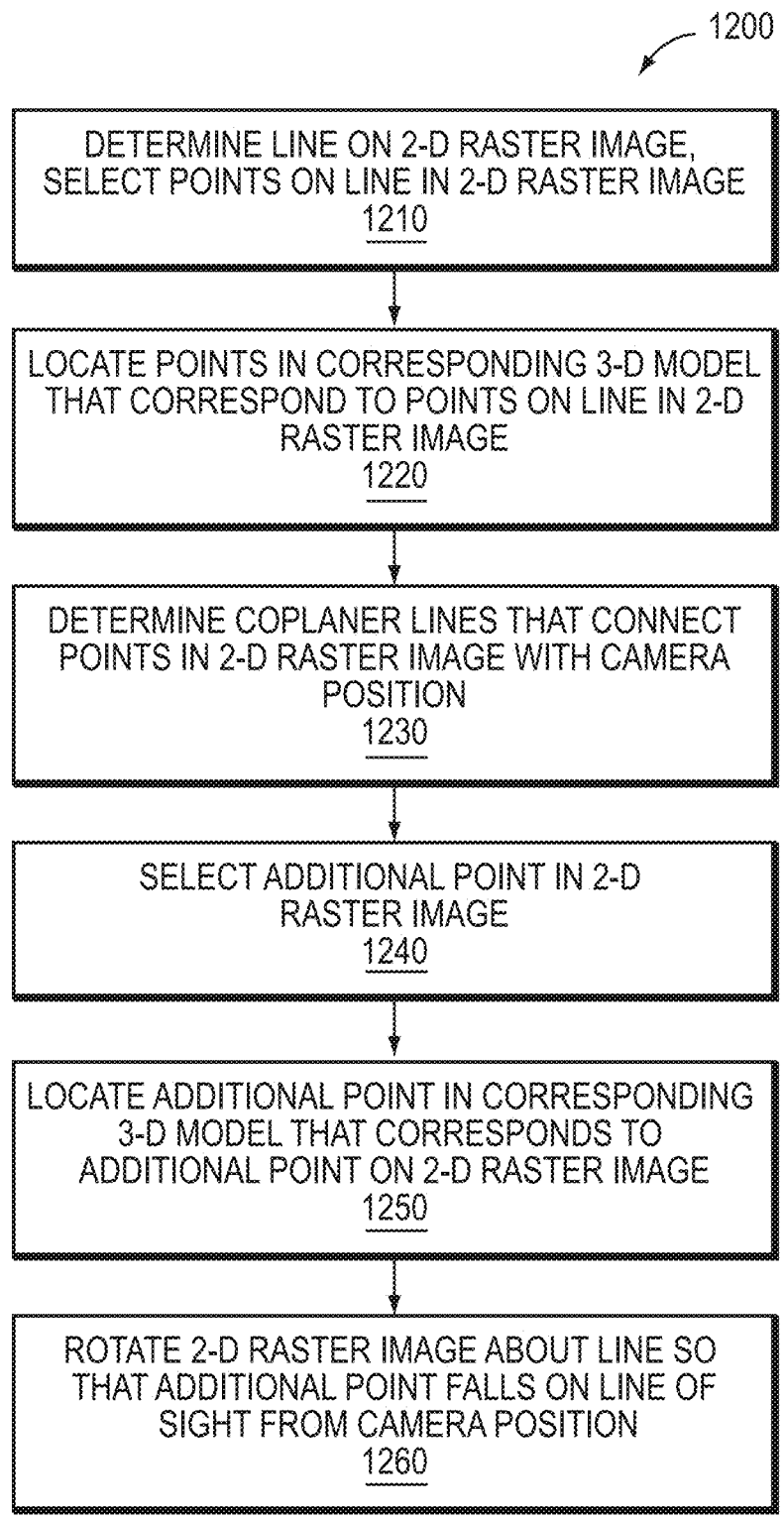
FIG. 12 is a flow diagram of an example sequence of steps that may be implemented by a processing routing to orientate and scale a 2-D raster image.

FIG. 12 is a flow diagram of an example sequence of steps 1200 that may be implemented by a processing routing to orientate and scale a 2-D raster image. At step 1210, the processing routing determines (e.g., "draws") a line on the 2-D raster image (e.g., photograph) that passes over features that are easily identifiable in a corresponding 3-D model, and selects a plurality of points (e.g., 3) corresponding to the features. The line may be one of the plurality of lines discussed above, and the points may be the points discussed above. For example, referring to the example simplified 2-D raster image of FIGS. 9-11B, points $A_1'$, $A_2'$ and $A_3'$ may be selected upon a line A.

At step 1220, the processing routing locates a plurality of points (e.g., 3) in the corresponding 3-D model that correspond to the plurality (e.g., 3) points on the line of the 2-D raster image. For example, the points in the corresponding 3-D model may be $A_1$, $A_2$ and $A_3$ that correspond to points $A_1'$, $A_2'$ and $A_3'$ on the 2-D raster image.

At step 1230, the processing routing determines in the 3-D model a plurality of (e.g., 3) coplanar lines that connect the plurality of points (e.g., 3) in the 2-D raster image with the calculated camera position (e.g., camera eye point). For example, for camera eye point E, lines $A_1$-E, $A_2$-E and $A_3$-E may be determined. This is sometimes referred to as a "pencil" in the field.

At step 1230, the processing routing locates the plurality of points (e.g., 3) in the 2-D raster image on lines of sight of the plurality of points (e.g., 3) in the corresponding 3-D model when viewed from the camera position (e.g., camera eye point).

At step 1240, the processing routine selects an additional point in the 2-D raster image. For example, an additional point $B_1'$ may be selected.

At step 1250, the processing routing locates an addition point in the corresponding 3-D model which corresponds to the additional point in the 2-D raster image. For example, an additional point $B_1$ may be located.

Finally, at step 1260, the processing routine rotates the 2-D raster image about the line determined in the 2-D raster image so that the additional point on the 2-D raster image falls on a line of sight from camera position to the additional point in the corresponding 3-D model, for example, so that point $B_1$ falls on the line of sight $E$-$B_1$. When this is complete, the 2-D raster image is now oriented and scaled to overlay the 3-D model.

In summary, the present disclosure describes techniques for employing a 3-D model as a navigable container for 2-D raster images, allowing 2-D raster images (e.g., photographs) to be maintained and displayed within the context of the 3-D model. It should be understood that various adaptations and modifications may be readily made to the techniques, to suit various implementations. Further, it should be understood that at least some of the techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors. Accordingly, it should be understood that the above descriptions are meant to be taken only by way of example.

What is claimed is:

1. A method comprising:
   displaying a three-dimensional (3-D) model of a structure in a user interface on a display screen of an electronic device;
   providing in the 3-D model, by the electronic device, icons that each correspond to a respective two-dimensional (2-D) raster image of the structure, each icon located at a position within 3-D space of the 3-D model corresponding to a position in physical space associated with the 2-D raster image;
   receiving a selection of a particular icon on an input device of the electronic device; and
   in response to receiving the selection of the particular icon, showing, in the user interface on the display screen of the electronic device, a combined view depicting a processed version of the corresponding 2-D raster image for the particular icon superimposed upon a corresponding portion of the 3-D model, as viewed from the position within 3-D space of the 3-D model, wherein the processed version of the corresponding 2-D raster image has a part removed to create a window through which one or more elements of the 3-D model are visible.

2. The method of claim 1, wherein the position within 3-D space of the 3-D model is a camera eye point, and the position in physical space associated with the 2-D raster image is a position where the 2-D raster image was captured.

3. The method of claim 1, wherein the 2-D raster image is a photograph.

4. The method of claim 1 wherein the icons are provided in an image cloud level of the 3-D model.

5. The method of claim 1, wherein the combined view is a saved view, and showing the combined view comprises:
   retrieving the saved view from storage in a memory.

6. The method of claim 1, further comprising:
   importing the 2-D raster image;
   determining camera parameters for use with the 3-D model based on the 2-D raster image, the camera parameters including the position within the 3-D space of the 3-D model;
   using the camera parameters to define a view of the 3-D model; and
   combining the 2-D raster image with the view of the 3-D model to produce the combined view.

7. A method comprising:
   importing a two-dimensional (2-D) raster image of a structure;
   determining camera parameters for use with a three-dimensional (3-D) model of the structure based on the 2-D raster image, the camera parameters including a position within 3-D space of the 3-D model corresponding to a position in physical space associated with the 2-D raster image;
   using, by an electronic device, the camera parameters to define a view of the 3-D model;
   processing the 2-D raster image to prepare the 2-D raster image, the processing to remove a part of the 2-D raster image to create a window;
   superimposing, by the electronic device, the processed 2-D raster image upon a corresponding portion of the view of the 3-D model to produce a combined view, the window in the processed 2-D raster image to render one or more elements of the 3-D model beneath the 2-D raster image visible in the combined view;

saving the combined view in a memory of the electronic device;

receiving a selection associated with the position within 3-D space of the 3-D model; and in response to receiving the selection, retrieving the saved view from the memory.

8. The method of claim 7, wherein the position in physical space associated with the 2-D raster image is a position where the 2-D raster image was captured.

9. The method of claim 7, wherein the position within 3-D space of the 3-D model is a camera eye point.

10. The method of claim 7, wherein the 2-D raster image is a photograph.

11. The method of claim 7, wherein the determining further comprises:

using geo-coordinate metadata of the 2-D raster image to derive the camera parameters.

12. The method of claim 7, wherein the determining further comprises:

using an image matching technique to derive the camera parameters.

13. The method of claim 7, further comprising:

displaying the saved view in a user interface on a display screen of the electronic device.

14. An electronic device comprising:

a display screen;

a processor configured to execute executable instructions and process data; and a memory configured to store the executable instructions and data, the executable instructions and data including:

a three-dimensional (3-D) model of a structure, and a modeling environment arranged to display the 3-D model on the display screen, the modeling environment model configured to:

provide, in the 3-D model, icons that each correspond to a respective two-dimensional (2-D) raster image of the structure, each icon located at a position within 3-D space of the 3-D model corresponding to a position in physical space associated with the 2-D raster image, process a selection of a particular icon, and in response to the selection of the particular icon, show, on the display screen, a combined view depicting at least a processed version of a corresponding 2-D raster image for the particular icon superimposed upon a corresponding portion of the 3-D model, as viewed from the position within 3-D space of the 3-D model, wherein the processed version of the corresponding 2-D raster image has a part removed to create a window through which one or more elements of the 3-D model are visible.

15. The electronic device of claim 14, wherein the position within 3-D space of the 3-D model is a camera eye point, and the position in physical space associated with the 2-D raster image is a position where the 2-D raster image was captured.

16. The electronic device of claim 14, wherein the 2-D raster image is a photograph.

* * * * *